United States Patent
Grinko

(10) Patent No.: US 12,023,749 B2
(45) Date of Patent: Jul. 2, 2024

(54) METHOD FOR GRINDING THE TOOTHING OF A GEAR

(71) Applicant: KAPP NILES GMBH & CO. KG, Coburg (DE)

(72) Inventor: Sergiy Grinko, Coburg (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 0 days.

(21) Appl. No.: 17/767,729

(22) PCT Filed: Oct. 5, 2020

(86) PCT No.: PCT/EP2020/077873
§ 371 (c)(1),
(2) Date: Apr. 8, 2022

(87) PCT Pub. No.: WO2021/069384
PCT Pub. Date: Apr. 15, 2021

(65) Prior Publication Data
US 2024/0091870 A1    Mar. 21, 2024

(30) Foreign Application Priority Data

Oct. 12, 2019   (DE) .................. 10 2019 127 520.2

(51) Int. Cl.
*B23F 23/12*   (2006.01)
*B23F 1/02*    (2006.01)

(52) U.S. Cl.
CPC .......... *B23F 23/1218* (2013.01); *B23F 1/023* (2013.01)

(58) Field of Classification Search
None
See application file for complete search history.

(56) References Cited

U.S. PATENT DOCUMENTS 4,850,155 A * 7/1989 Sulzer ................ B23F 19/007
                                                451/148
5,174,070 A   12/1992 Loesch
(Continued)

FOREIGN PATENT DOCUMENTS

DE           4119871 C1    5/1992
DE     102010055820 A1    6/2012
(Continued)

*Primary Examiner* — Peter J Macchiarolo
*Assistant Examiner* — Jermaine L Jenkins
(74) *Attorney, Agent, or Firm* — LUCAS & MERCANTI, LLP; Klaus P. Stoffel

(57) ABSTRACT

A method for grinding a gear toothing, in which a target value with a tolerance range is defined for the tooth width. The method includes: a) measuring the location of the surface of the tooth flanks of the gear at least two axial positions offset in the direction of the axis of rotation; b) determining the actually present allowance of the gear based on the measured values determined in step a); c) grinding the toothing by radial infeed of the grinding tool relative to the toothing, c1) wherein the radial infeed corresponds to the target value of the tooth width, if the determination under step b) indicated that such an allowance is present on all tooth flanks that material will be removed from all tooth flanks, or c2) wherein the radial infeed takes place at a value higher than the target value of the tooth width, the higher value still corresponding to the tolerance range for the tooth width, if the determination under step b) indicated that such an allowance is present on all tooth flanks that material will be removed from all tooth flanks only with increased radial infeed.

10 Claims, 8 Drawing Sheets

(56) References Cited

U.S. PATENT DOCUMENTS

| | | | |
|---|---|---|---|
| 6,577,917 B1 | 6/2003 | Ronneberger | |
| 8,932,105 B2* | 1/2015 | Heidelmann | B23F 1/02 |
| | | | 451/5 |
| 9,696,713 B2* | 7/2017 | Müller | G05B 19/406 |
| 10,018,459 B2* | 7/2018 | Wuerfel | G05B 19/4145 |
| 10,507,538 B2 | 12/2019 | Mueller | |
| 11,059,116 B2* | 7/2021 | Würfel | G05B 19/186 |
| 11,278,976 B2* | 3/2022 | Hoener | B23P 15/14 |

FOREIGN PATENT DOCUMENTS

| | | |
|---|---|---|
| DE | 102016005305 A1 | 11/2017 |
| EP | 0890144 B1 | 5/2002 |
| EP | 2583779 A1 | 4/2013 |
| EP | 3407011 A1 | 11/2018 |
| EP | 3456453 A1 | 3/2019 |
| WO | 2006053447 A1 | 5/2006 |

\* cited by examiner (STATE OF THE ART)

METHOD FOR GRINDING THE TOOTHING OF A GEAR

CROSS-REFERENCE TO RELATED APPLICATIONS

The present application is a 371 of International application PCT/EP2020/077873, filed Oct. 5, 2020, which claims priority of DE 10 2019 127 520.2 filed Oct. 12, 2019, the priority of these applications is hereby claimed and the applications are incorporated herein by reference.

BACKGROUND OF THE INVENTION

The invention relates to a method for grinding the toothing of a gear, wherein the gear has an axis of rotation, wherein the grinding being carried out by bringing a grinding tool into engagement with the toothing and grinding off an allowance on the tooth flanks of the toothing, wherein a nominal value for the width of teeth and/or for the spherical measure is predetermined for the toothing, wherein a tolerance band is predetermined for the nominal value, the observance of which still leads to good parts (i.e. to those parts where all tooth spaces have been ground perfectly and the specified tolerance for the width of teeth and/or for the spherical measure is met).

When grinding the toothing of a gear, the grinding tool, for example a grinding wheel, is brought into engagement with the toothing to be ground, whereby the allowance on the tooth flanks before grinding is ground off. For this purpose, the grinding tool must first be centered in the tooth space.

This known process is illustrated in FIG. 1. The gear 2 with the toothing 1 to be ground rotates about the axis of rotation a of the gear 2, while a sensor 3, for example an inductive sensor, records measurement data from which the position of the tooth space can be inferred. The sensor 3 is usually positioned axially centrically here. During rotation of the gear 2, the sensor 3 records the signals from the two tooth flanks. In the machine control system, these signals can then be used to calculate where the center of the tooth space is located. The grinding tool is then positioned accordingly in the center of the tooth space.

The actual grinding process then takes place. The grinding tool is radially fed relative to the workpiece (gear) in such a way that the toothing has the desired width of teeth or the desired spherical measure (or roller measure, which is equivalent to the spherical measure and uses measuring rollers instead of measuring balls) after grinding. Thus, the infeed of the grinding tool to the workpiece results from the corresponding specification of the nominal value for the width of teeth or for the spherical measure (or roller measure). In this case, the tool is advanced towards the workpiece in accordance with the nominal value in order to be able to use the tolerance band in the event of production-related deviations and to be able to produce as many good parts as possible. This distance between workpiece and tool is usually not changed during the entire batch of gears to be machined.

The width of teeth is the distance between two flat measuring surfaces placed tangentially to the tooth flanks, with a defined number of teeth between the measuring surfaces during measurement. The width of teeth can be used to determine the thickness of the teeth. It is suitable as a simple quality inspection method for the ground gear.

The spherical measure (or roller measure) is also a parameter for determining the tooth thickness of the toothing, whereby balls (or rollers) are inserted into diametrically opposed tooth spaces of the toothing and the distance between the balls (or rollers) is determined.

Accordingly, this measurement is also a determinant of tooth thickness and is suitable as a quality inspection method for the ground gear.

As a rule, a nominal value is specified for the width of teeth or spherical measure (or roller measure), for which a defined tolerance band applies. Accordingly, the width of teeth or the spherical measure may deviate from the nominal value by a specified value so that the gear can still be qualified as a good part.

Due to the usual manufacturing procedure up to now, it is inevitable, depending on the quality of the pre-machining of the gear, that a certain amount of scrap will occur, since not all tooth flanks will be ground if the constellation is unfavorable. In particular, it is possible that with the given machine setting (relative infeed of the tool to the workpiece) some tooth flanks will not be "clean" and thus lead to scrap.

SUMMARY OF THE INVENTION

The invention is based on the object of further developing a generic process in such a way that it is possible to achieve a higher proportion of good parts with the highest possible quality.

The solution of this problem by the invention provides that the method comprises the steps:
   a) Measuring the position of the surface of the tooth flanks of the not yet ground gear at least two axial positions of the gear offset in the direction of the axis of rotation;
   b) Determining the actual present allowance of the gear which is not yet ground on the basis of the measured values determined in step a);
   c) Grinding of the toothing by radial infeed of the grinding tool relative to the toothing,
   c1) wherein the radial infeed of the grinding tool relative to the toothing corresponds to the nominal value of the width of teeth and/or of the spherical measure, if the determination according to step b) has shown that such an allowance is present on all tooth flanks that material removal occurs on all tooth flanks, or
   c2) wherein the radial infeed of the grinding tool relative to the toothing is effected to a higher value than corresponds to the nominal value of the width of teeth and/or of the spherical measure, wherein the higher value still corresponding to the tolerance band for the width of teeth and/or for the spherical measure, if the determination according to step b) has shown that only with increased radial infeed on all tooth flanks is there such an allowance that material removal occurs on all tooth flanks.

According to the invention, the generally desired center of the tolerance band for the tooth width or for the spherical measure is systematically left in the direction of the end of the tolerance band during the radial infeed of the tool relative to the workpiece, but the given tolerance band is maintained if the determination of the actual allowance has shown that a good part can still be ground by the said change in the radial infeed.

In addition, it can be provided that grinding according to step c) above is not performed if the determination according to step b) above has shown that even with an increased radial infeed up to the limit of the tolerance band, there is only such an allowance that no material removal would occur during grinding on at least one tooth flank. In this case, the production of a good part is no longer possible.

The measurement of the position of the surface of the tooth flanks according to step a) above can be carried out with at least two sensors which are offset in the direction of the axis of rotation but are arranged at the same circumferential position of the gear.

Alternatively, it can also be provided that the measurement of the position of the surface of the tooth flanks according to step a) above is carried out with at least two sensors which are offset in the direction of the axis of rotation and arranged at different circumferential positions of the gear. This can prove to be very advantageous for reasons of the available installation space.

Another alternative option provides that the measurement of the position of the surface of the tooth flanks according to step a) above is carried out with a single sensor, which is arranged movably in the direction of the axis of rotation.

An optically acting sensor can be used as the sensor, whereby a laser can be used in particular. Inductive or capacitive sensors are equally suitable. Sensors that use eddy currents are also generally suitable.

A grinding worm is preferably used as the grinding tool. However, the use of a grinding wheel is equally possible.

The gear to be machined is preferably one with external teeth, although internal teeth are of course also possible.

The present invention therefore aims to determine the actual allowance of the gear teeth to be ground and to adaptively select an adjustment of the radial infeed of the grinding tool relative to the gear teeth in such a way that the gear can be ground as a good part, i.e. that all tooth flanks are machined. For this purpose, the given tolerance range for the width of teeth or for the spherical measure (or roller measure) is used.

This provides an effective way of increasing the proportion of good parts in the grinding of gears and, in particular, of being able to grind workpieces as good parts that have previously become rejects.

BRIEF DESCRIPTION OF THE DRAWING

Examples of embodiments of the invention are shown in the drawing.

DETAILED DESCRIPTION OF THE INVENTION

Figure 1:
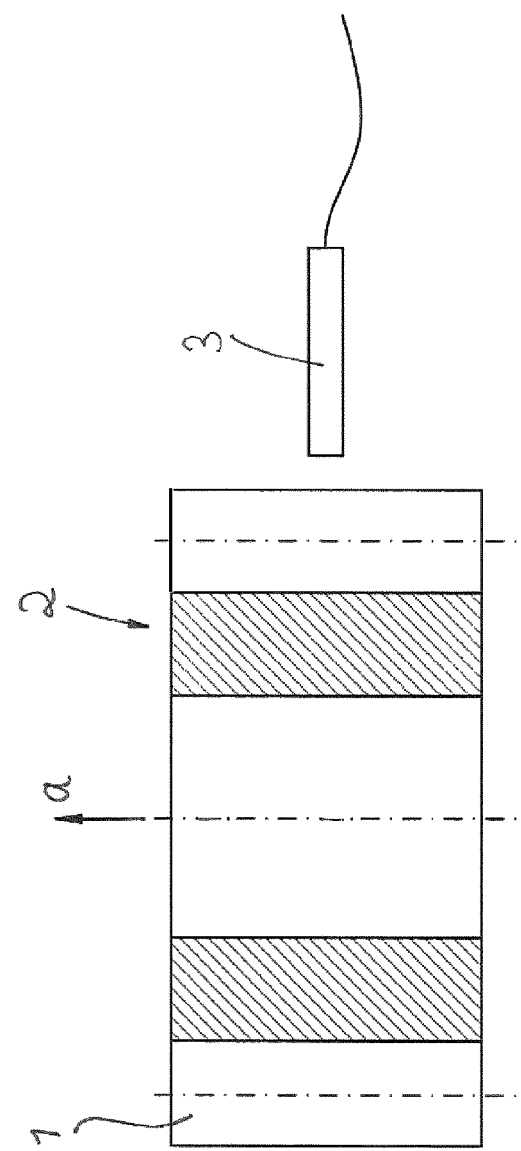
FIG. 1 shows a schematic depiction of the centering of a grinding tool in the tooth space of a gear according to the prior art.
Figure 2:
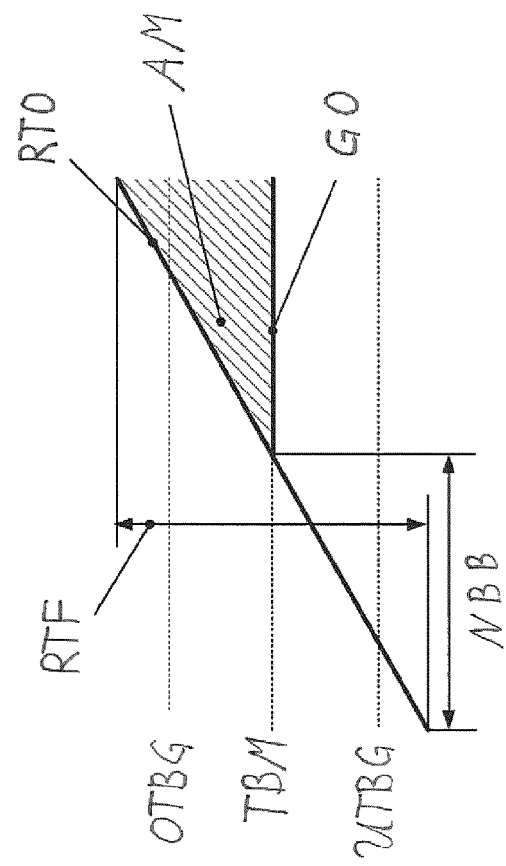
FIG. 2 shows schematically the grinding of a gear with an excessive raw part defect.

First of all, FIG. 2 shows a schematic representation of the problem underlying the invention. It is shown schematically that a certain raw part deficiency RTF results for the toothing of a gear, which is a result of the pre-machining.

After hardening, the gear teeth are often distorted and thus exhibit unsystematic errors in the gear tooth profile, the gear tooth line and the gear tooth dimension. Furthermore, there may be wobble with respect to the clamping bore. Thus, the gear to be machined has said raw part deficiency RTF.

This total deficiency can be quantitatively greater than the available tolerance band for the width of teeth or for the spherical measure, as shown in FIG. 2. The predetermined width of teeth or the predetermined spherical measure is indicated schematically by the tolerance band center TBM, i.e. the radial infeed of the grinding tool to the toothing is selected so that the tolerance band center TBM results. However, a tolerance band is predetermined for a good part in which the width of teeth or the spherical measure must lie; the upper tolerance band limit OTBG and the lower tolerance band limit UTBG are shown schematically in FIG. 2.

The tolerance range for the width of teeth is usually in the range of 10% to 30% of the allowance.

The raw part initially has the raw part surface RTO on its tooth flanks, from which material is ground off, i.e. material AM to be ground off. This results in a ground surface GO.

As can be seen from FIG. 2, it is not possible to grind a good part in this way because the level of the blank surface RTO is partly below the ground surface GO (see left section in FIG. 2: unmachined area NBB); the available stock allowance is therefore insufficient to grind a good part. The gear for which the conditions shown in FIG. 2 are present will thus inevitably be a reject. The raw part deficiency RTF is greater than the tolerance band for width of teeth or spherical measure.

Figure 3:
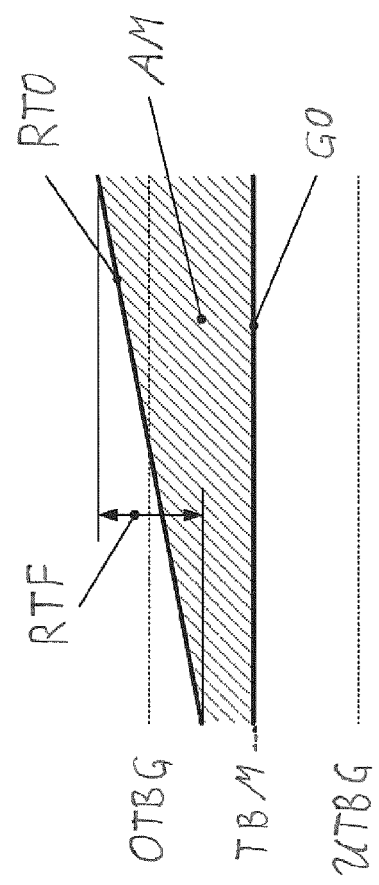
FIG. 3 shows schematically the grinding of a gear with sufficient stock allowance.

FIG. 3 shows the conditions that result when there is sufficient allowance on the tooth flanks and the gear teeth can be ground properly without any problems. It can be seen that the raw part deficiency RTF lies in a range that is above the tolerance band center TBM with respect to the tolerance for width of teeth or spherical measure. This means that material AM to be ground is present on all tooth flanks, so that a good part can be ground even without using the process according to the invention, i.e. in the classic manner when the relative position between the workpiece and the tool is set to the center of the tolerance band.

Figure 4:
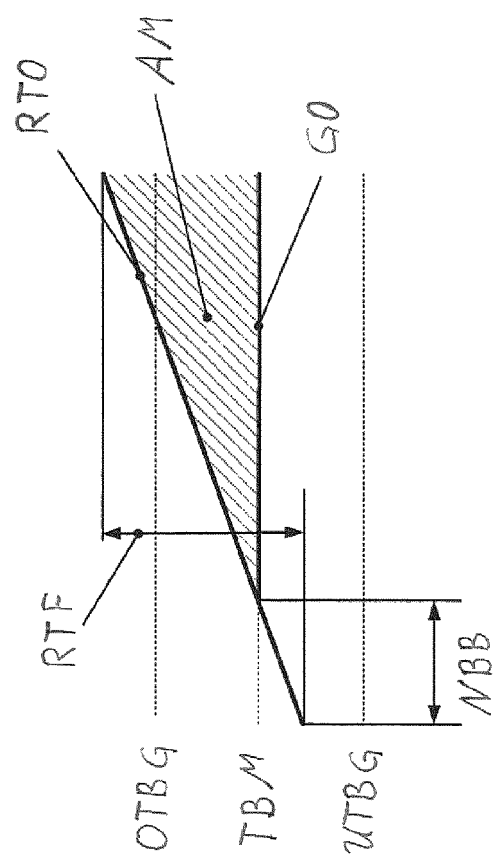
FIG. 4 shows schematically the grinding of a gear with an excessive raw part defect.

FIG. 4 now shows the conditions that would lead to a reject part when grinding according to the state of the art, which can, however, be avoided when using the process according to the invention:

First of all, it can be seen that the given surface of the raw part RTO leads to a raw part deficiency RTF, which is problematic if, in the classic manner, the radial infeed between the grinding tool and the toothing is at the level of the tolerance band center TBM for width of teeth and spherical measure respectively. In this case (see FIG. 4: unmachined area NBB), there will be tooth flanks that can no longer be ground cleanly because the surface of the raw part RTO falls below the tolerance band center TBM.

Figure 5:
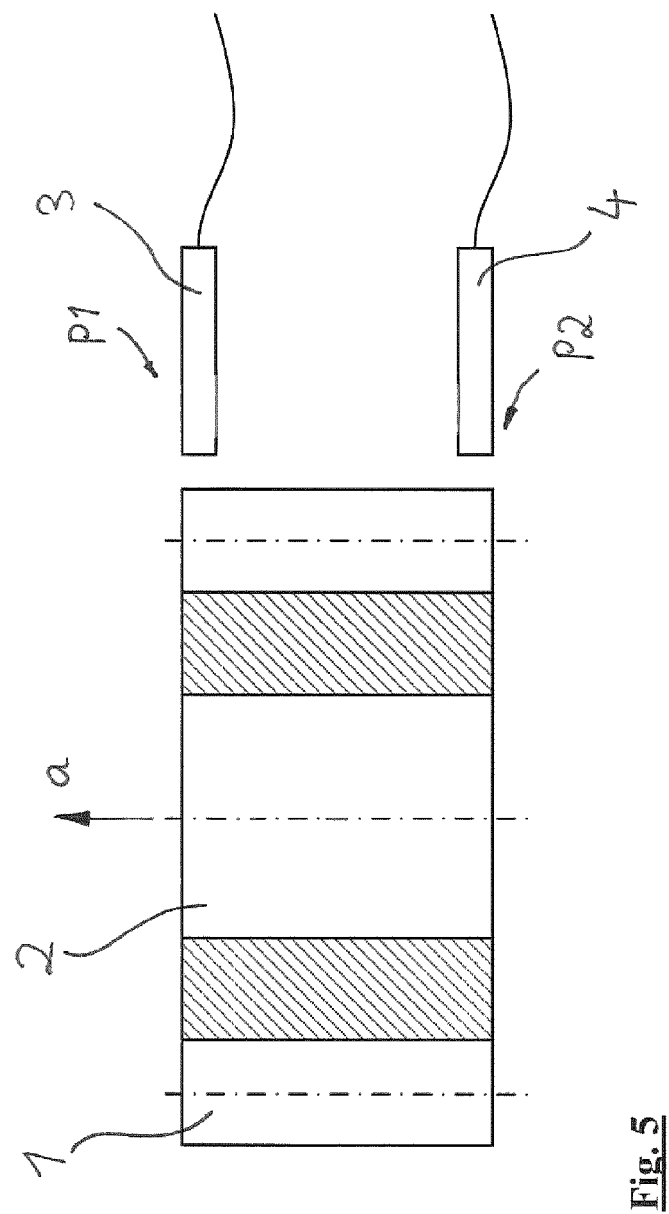
FIG. 5 shows schematically the measurement of the allowance of a gear according to a first embodiment of the invention.

This is where the invention comes in:

First, the position of the surface of the tooth flanks of the not yet ground gear is measured. Whereas in the prior art, but here for the centering, a measurement signal is recorded in only one plane and thus no information is available about the gear width, according to the invention a measurement is made at at least two axially offset positions P1 and P2, as shown in FIG. 5. The two sensors 3 and 4 are located approximately in the two axial end regions of the toothing 1 and measure the effective allowance on the tooth flanks.

The signals from sensors 3 and 4 are picked up by the machine control (not shown), which can determine the actual stock allowance at the two measuring points P1 and P2 when the workpiece 2 rotates, taking into account the associated signals from sensors 3 and 4. Of course, more measuring points can also be provided in order to obtain more precise information regarding the actual stock allowance.

This means that information is now available on the distribution of the allowance over the toothing width (which can be done with sufficient accuracy by using an appropriate number of sensors).

The gear teeth are now ground by radial infeed of the grinding tool (not shown) relative to the toothing 1.

If a situation has been determined which corresponds to that shown in FIG. 2, grinding the part makes no sense, since not all tooth flanks can be ground cleanly. In this case, the gear can be removed immediately as scrap.

If the situation is as shown in FIG. 3, grinding in the classical way is possible and makes sense: The radial infeed of the grinding tool relative to the toothing 1 corresponds to the nominal value (TBM) of the width of teeth or the spherical measure; such an allowance is present on all tooth flanks that chip removal occurs on all tooth flanks.

If, however, on the basis of the measurement carried out by means of sensors 3, 4, a situation such as that shown in FIG. 4 exists, the following procedure is followed in modification of the classical procedure: The radial infeed of the grinding tool relative to the toothing 1 is set to a higher value than the nominal value TBM of the width of teeth or the spherical measure. However, the higher value still corresponds to the tolerance band and does not fall below the lower tolerance band limit UTBG for the width of teeth or the spherical measure.

Figure 8:
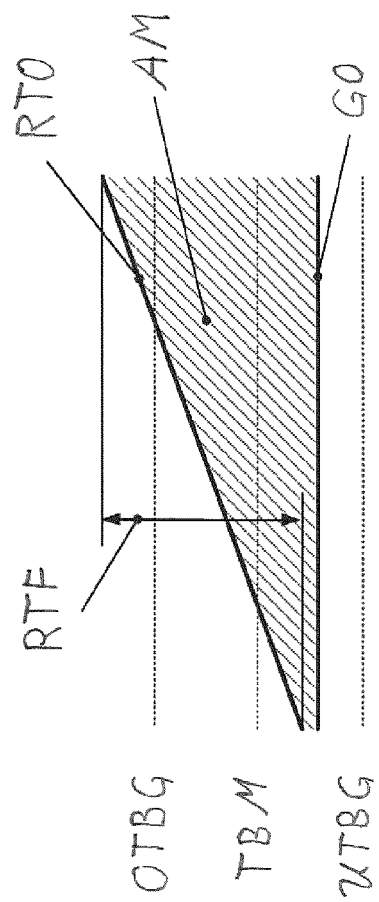

This situation is shown in FIG. 8. The radial infeed between the workpiece and the tool is now deeper than in FIG. 3 or FIG. 4, but still within the tolerance band, so that the ground surface GO is so deep that the given raw part deficiency RTF does not lead to tooth flanks not being ground "cleanly". This means that only with the increased radial infeed mentioned above is there sufficient stock on all tooth flanks so that chip removal occurs on all tooth flanks and a good part is obtained.

Figure 6:
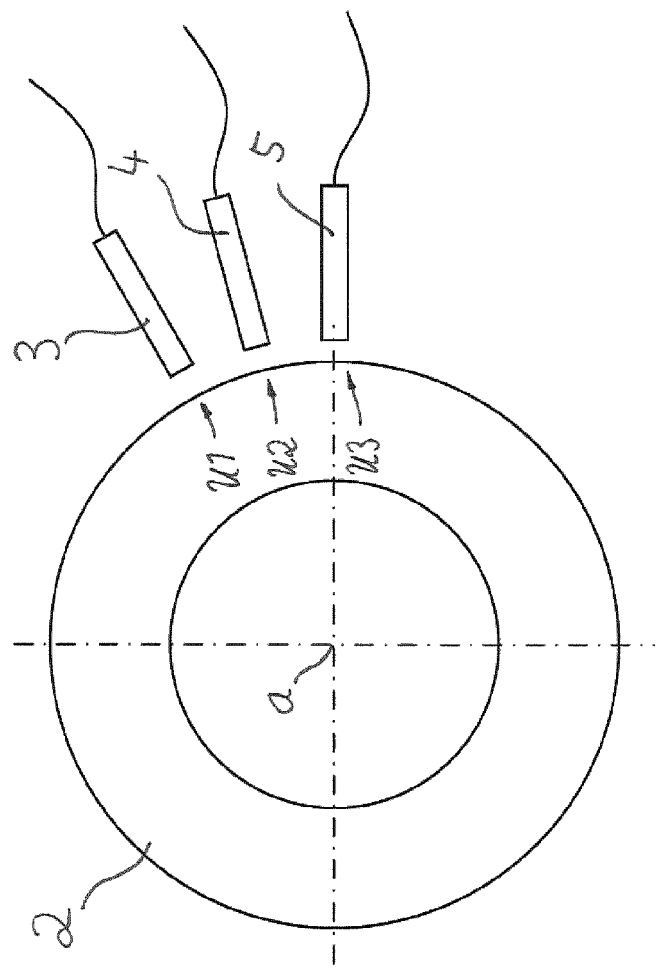
FIG. 6 shows schematically the measurement of the allowance of a gear according to a second embodiment of the invention.
Figure 7:
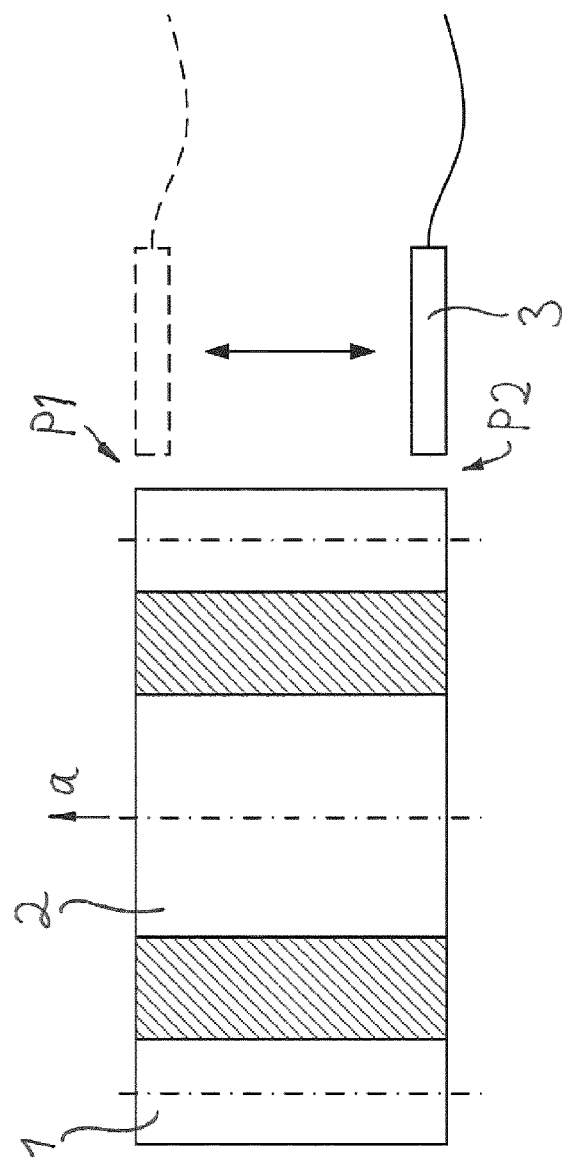
FIG. 7 shows schematically the measurement of the allowance of a gear according to a third embodiment of the invention and FIG. 8 shows schematically the grinding of a gear wheel according to the concept of the invention.

For measuring the position of the surface of the tooth flanks, i.e. the actual allowance, of the not yet ground gear, two alternatives to the solution according to FIG. 5 are shown in FIGS. 6 and 7:

FIG. 6 shows that the measurement is carried out with several sensors, here with the three sensors 3, 4 and 5, offset in the direction of the axis of rotation a and at the same time also offset in the circumferential direction. The three sensors 3, 4, 5 are arranged at different circumferential positions U1, U2 and U3. In this way, it is possible to accommodate all the required sensors in a space-saving manner, particularly where installation space is limited. This applies in particular in the case of a small tooth width.

FIG. 7 shows a variant in which a measurement can be made in several planes with only a single sensor 3. For this purpose, the sensor 3 is moved axially in the direction of the double arrow and the measured signals are recorded simultaneously. Thus, a spiral-shaped signal is then recorded here, which can be converted by the machine control into the effective allowance at the tooth flanks. Of course, it is also possible to carry out the measurement with the sensor stationary and then to move it axially successively for measurement in several planes.

The sensors 3, 4, 5 can either be placed separately or in one housing.

For all measurements, the machine control can determine from the (current) position of the sensor(s) and the rotational position of the toothing 1 where the surface of the measured tooth flank is located, so that the required information about the raw part surface and the effectively available stock allowance can be obtained. It is essential that the explained measurement can be used to obtain information about the allowance over the width of the gear teeth.

In other words, if the relative positioning of the sensors to each other is known, it is possible to determine the allowance distribution of the toothing by converting the signals of the sensors accordingly, taking into account the geometry of the gear (in particular the helix angle in the case of helical toothing).

Thus, the proposed method allows the gears to be ground to be measured over the toothing width, i.e. in the direction of the flank line, prior to machining and, in the given case, a specific axial distance change between the workpiece and tool is then carried out, so that a gear which would be rejected in the classic production method can still be ground as a good part.

The advantage of the proposed process is thus that the proportion of good parts can be increased, while at the same time enabling efficient production.

In general, it would also be possible to inspect and regrind a gear with the ratios shown in FIGS. 4 and 8 after initial conventional grinding (to the center of the tolerance band TBM), since there is generally still sufficient stock allowance to produce a good part. In practice, however, this fails because the part, which is then already pre-ground with only a small stock allowance, can no longer be centered with sufficient accuracy (the residual stock allowance is possibly already smaller than the alignment error, and when regrinding such parts it is likely that only one-sided machining of the tooth flanks will be performed). This problem can be eliminated by the method according to the invention.

LIST OF REFERENCES

1 Toothing
2 Gear
3 Sensor
4 Sensor
5 Sensor
a Axis of rotation of the gear
P1 First axial position
P2 Second axial position
U1 First circumferential position
U2 Second circumferential position
U3 Third circumferential position
RTO Surface of the raw part
RTF Deficiency of the raw part
TBM Middle of the tolerance band for the width of teeth/for the spherical measure
OTBG Upper limit for the tolerance band
UTBG Lower limit for the tolerance band
AM Material to be ground
NBB Not machined area
GO Ground surface

The invention claimed is:

1. A method for grinding the toothing of a gear, wherein the gear has an axis of rotation, wherein the grinding being carried out by bringing a grinding tool into engagement with the toothing and grinding off an allowance on the tooth flanks of the toothing, wherein a nominal value for the width of teeth and/or for the spherical measure is predetermined for the toothing, wherein a tolerance band is predetermined for the nominal value, the observance of which still leads to good parts, wherein the method comprises the steps of:

a) measuring the position of the surface of the tooth flanks of the not yet ground gear at least two axial positions of the gear offset in the direction of the axis of rotation;

b) determining the actual present allowance of the gear which is not yet ground on the basis of the measured values determined in step a);

c) grinding of the toothing by radial infeed of the grinding tool relative to the toothing, c1) wherein the radial infeed of the grinding tool relative to the toothing corresponds to the nominal value of the width of teeth and/or of the spherical measure, if the determination according to step b) has shown that such an allowance is present on all tooth flanks that material removal occurs on all tooth flanks, or c2) wherein the radial infeed of the grinding tool relative to the toothing is effected to a higher value than corresponds to the nominal value of the width of teeth and/or of the spherical measure, wherein the higher value still corresponding to the tolerance band for the width of teeth and/or for the spherical measure, if the determination according to step b) has shown that only with increased radial infeed on all tooth flanks is there such an allowance that material removal occurs on all tooth flanks.

2. The method according to claim 1, wherein the grinding according to step c) is not carried out if the determination according to step b) has shown that even with an increased radial infeed up to the limit of the tolerance band only such an allowance is present that no material removal would occur during grinding on at least one tooth flank.

3. The method according to claim 1, wherein the measurement of the position of the surface of the tooth flanks according to step a) is carried out with at least two sensors which are offset in the direction of the axis of rotation but are arranged at the same circumferential position of the gear.

4. The method according to claim 3, wherein an optically acting sensor is used as sensor.

5. The method according to claim 3, wherein an inductively or capacitively acting sensor is used as the sensor.

6. The method according to claim 1, wherein the measurement of the position of the surface of the tooth flanks according to step a) is carried out with at least two sensors which are offset in the direction of the axis of rotation and arranged at different circumferential positions of the gear.

7. The method according to claim 1, wherein the measurement of the position of the surface of the tooth flanks according to step a) is carried out with a single sensor which is arranged movably in the direction of the axis of rotation.

8. The method according to claim 1, wherein a grinding worm is used as grinding tool.

9. The method according to claim 1, wherein a grinding wheel is used as grinding tool.

10. The method according to claim 1, wherein the gear is one with external toothing.

* * * * *